US010897368B2

(12) United States Patent
Mahmoud

(10) Patent No.: US 10,897,368 B2
(45) Date of Patent: Jan. 19, 2021

(54) INTEGRATING AN INTERACTIVE VIRTUAL ASSISTANT INTO A MEETING ENVIRONMENT

(71) Applicant: Cisco Technology, Inc.

(72) Inventor: Mohamed Gamal Mohamed Mahmoud, Santa Clara, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 101 days.

(21) Appl. No.: 15/955,529

(22) Filed: Apr. 17, 2018

(65) Prior Publication Data

US 2019/0319811 A1 Oct. 17, 2019

(51) Int. Cl.
*H04L 12/18* (2006.01)
*G06F 40/205* (2020.01)
*G06F 40/226* (2020.01)

(52) U.S. Cl.
CPC ........ *H04L 12/1818* (2013.01); *G06F 40/205* (2020.01); *H04L 12/1822* (2013.01); *H04L 12/1831* (2013.01); *G06F 40/226* (2020.01)

(58) Field of Classification Search
CPC .. G06F 17/2705; G06F 17/271; G06F 40/205; G06F 40/20; G06F 40/226; G06F 40/211
See application file for complete search history.

(56) References Cited

U.S. PATENT DOCUMENTS

| | | | |
|---|---|---|---|
| 6,697,801 B1 * | 2/2004 | Eldredge | G06F 16/313 |
| 8,838,440 B2 * | 9/2014 | Iwama | G06F 17/2705 704/1 |
| 9,026,431 B1 * | 5/2015 | Moreno Mengibar | G10L 15/1822 704/10 |
| 10,403,272 B1 * | 9/2019 | Fanty | G10L 15/22 |
| 2006/0277028 A1 * | 12/2006 | Chen | G06F 17/2715 704/4 |
| 2014/0279864 A1 * | 9/2014 | Lopyrev | G06F 17/2705 707/609 |
| 2014/0337814 A1 * | 11/2014 | Kalns | G06F 8/00 717/100 |
| 2015/0193391 A1 * | 7/2015 | Khvostichenko | G06Q 10/00 715/205 |
| 2015/0193392 A1 * | 7/2015 | Greenblatt | G06Q 10/109 715/205 |
| 2015/0348551 A1 * | 12/2015 | Gruber | G10L 15/1815 704/235 |

(Continued)

*Primary Examiner* — Samuel G Neway

(74) *Attorney, Agent, or Firm* — Merchant & Gould P.C.

(57) ABSTRACT

Various embodiments of the present disclosure set forth a computer-implemented method for integrating an interactive virtual assistant in a meeting environment. The method comprises receiving an invitation to participate in the meeting environment, where the invitation includes text information, and applying at least a subset of a plurality of parsers to the text information in a given order to generate a text match for each of a plurality of fields of meeting information. The method further comprises, in response, when the text matches for at least a subset of the plurality of fields of meeting information meet one or more predetermined threshold criteria, causing the interactive virtual assistant to join the meeting environment based on the text matches for the at least the subset of the plurality of fields of meeting information.

20 Claims, 5 Drawing Sheets

(56) References Cited

U.S. PATENT DOCUMENTS

2015/0356094 A1* 12/2015 Gorelik ................ G06F 16/211
                                                        707/748
2016/0335532 A1* 11/2016 Sanghavi ............... G06N 3/006
2019/0319811 A1* 10/2019 Mahmoud .......... H04L 12/1831

* cited by examiner

INTEGRATING AN INTERACTIVE VIRTUAL ASSISTANT INTO A MEETING ENVIRONMENT

BACKGROUND

Technical Field

Embodiments of the present disclosure relate generally to interactive virtual assistants, and, more specifically, to integrating interactive virtual assistants into a meeting environment.

Description of the Related Art

Interactive virtual assistants are becoming more commonplace to provide an easy way for a human user to accomplish the user's goals via a computer. In conventional approaches, interactive virtual assistants may receive a voice input from the human user, parse the words spoken by the user, and cause an action requested by the user to be performed. For instance, the user may request ordering a particular item from a shopping website or making a phone call to a person whose contact information is stored in a contact database. In response, the interactive virtual assistant causes a computer to order the requested item or causes a telephone to make the requested call.

However, conventional approaches have not effectively integrated interactive virtual assistants into a meeting environment. In particular, conventional approaches to parsing language received from a user, either in voice or text form, have used a rigid parsing mechanism that performs parsing according to fixed parsing rules. In conventional approaches, these fixed parsing rules are applied to all incoming voice or text information.

The technological problem with these conventional approaches to parsing language is that rigidly applying the fixed parsing rules to all incoming information results in many mistakes in determining what information is being provided by the user. For instance, conventional approaches may not be able to determine the correct text information provided by the user if the text provided by the user is not in a format recognized by the rigid set of parsing rules.

As the foregoing illustrates, a technological improvement in the form of an improved technique for integrating an interactive virtual assistant in a meeting environment is desirable.

SUMMARY

Various embodiments of the present disclosure set forth a computer-implemented method for integrating an interactive virtual assistant in a meeting environment. The method comprises receiving an invitation to participate in the meeting environment, where the invitation includes text information, and applying at least a subset of a plurality of parsers to the text information in a given order to generate a text match for each of a plurality of fields of meeting information, where, if applying a first parser included in the plurality of parsers to the text information for a first text field produces a preferred match, then returning the preferred match for the first text field without applying any additional parsers included in the plurality of parsers to the text information for the first text field. The method further comprises, in response, when the text matches for at least a subset of the plurality of fields of meeting information meet one or more predetermined threshold criteria, causing the interactive virtual assistant to join the meeting environment based on the text matches for the at least the subset of the plurality of fields of meeting information.

Other embodiments of the present disclosure include, without limitation, a computer-readable medium including instructions for performing one or more aspects of the disclosed techniques, as well as a computing device for performing one or more aspects of the disclosed techniques.

At least one advantage of the disclosed techniques is that, by parsing different fields of meeting information in a hierarchical manner, the likelihood of finding a text match is increased. Specifically, the different hierarchical fields will have different priorities according to a predetermined hierarchy, such that higher-priority fields will take precedence over lower-priority fields. For instance, the parsing mechanism may disambiguate between different conflicting fields of meeting information, since the higher-priority fields will be used in place of any conflicting lower-priority fields.

A further advantage of the disclosed techniques is that, if a preferred match for a particular field of meeting information is found immediately, that preferred match is accepted and stored as the corresponding field of meeting information without requiring the parsing mechanism to continue to run all of the multiple different text parsers, thereby increasing efficiency in the parsing mechanism by preventing multiple unnecessary text parsers from being executed. Accordingly, when the multiple different text parsers are arranged in a hierarchy, such as when a higher-priority text parser has a higher probability of finding a preferred match, then applying these multiple different text parsers in the particular order specified by the hierarchy increases efficiency by increasing the probability that a preferred match will be found earlier in the parsing process.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

In the following description, numerous specific details are set forth to provide a more thorough understanding of the present disclosure. However, it will be apparent to one of skill in the art that the present disclosure may be practiced without one or more of these specific details.

System Overview

Figure 1:
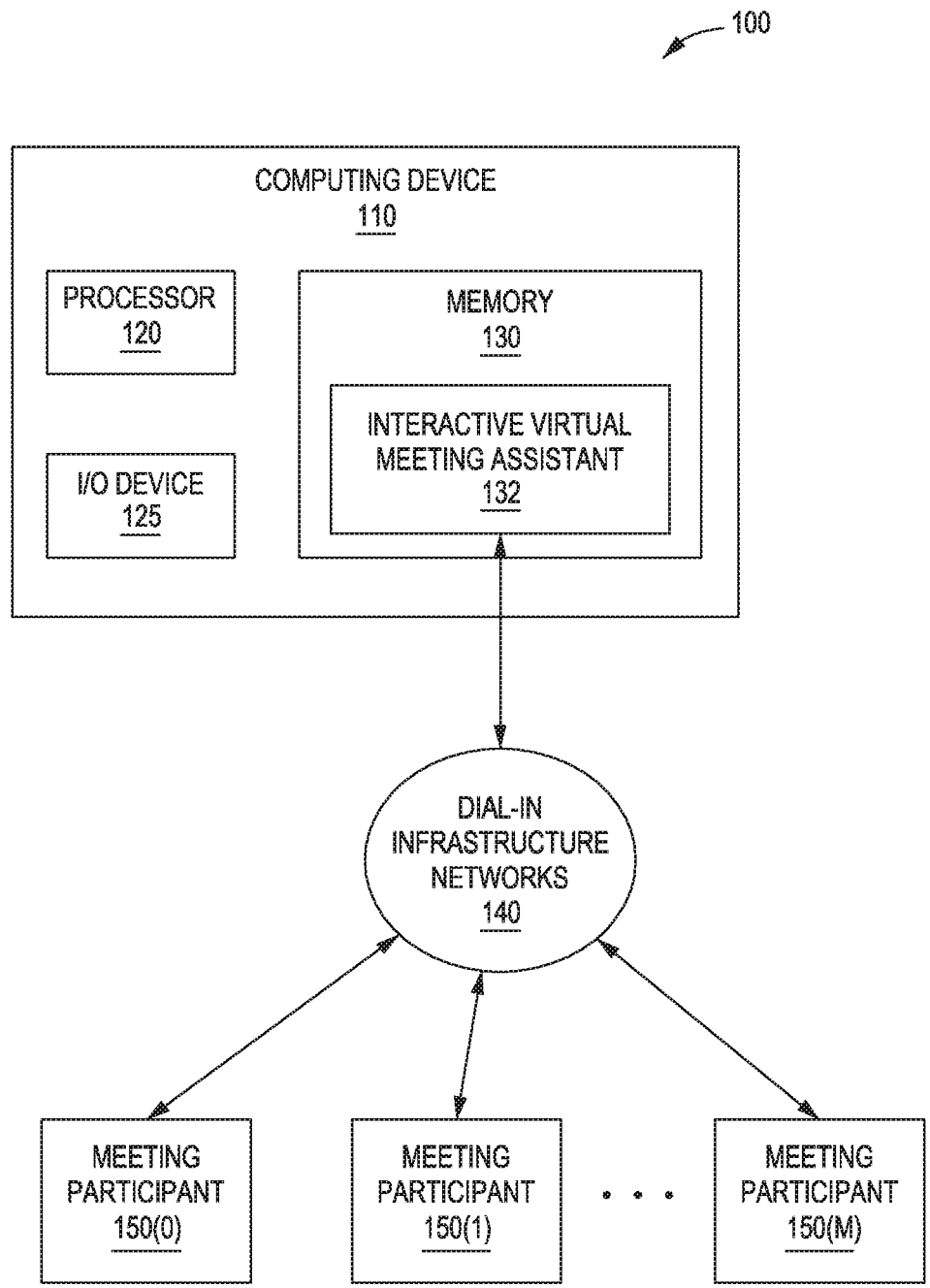
FIG. 1 is a block diagram illustrating a system configured to implement one or more aspects of the present disclosure.

FIG. 1 illustrates a system 100 configured to implement one or more aspects of the present disclosure. As shown, system 100 includes, without limitation, a computing device 110 coupled via dial-in infrastructure networks 140 to multiple meeting participants 150(0) to 150(m).

As shown, the computing device 110 includes, without limitation, a processor 120, input/output (I/O) devices 125, and a memory 130. Processor 120 may be any technically feasible form of processing device configured to process data and execute program code. Processor 120 could be, for example, a central processing unit (CPU), a graphics processing unit (GPU), an application-specific integrated circuit (ASIC), a field-programmable gate array (FPGA), and so forth. I/O devices 125 may include devices configured to receive input or provide output, including, for example, a keyboard, a mouse, a display, and so forth.

Memory 130 may be any technically feasible storage medium configured to store data and software applications. Memory 130 may be, for example, a hard disk, a random-access memory (RAM) module, a read-only memory (ROM), and so forth. As also shown, the memory 130 includes, without limitation, an interactive virtual meeting assistant 132, which is a software application that, when executed by the processor 120, causes processor 120 to execute an interactive virtual meeting assistant application. The interactive virtual meeting assistant 132 may include any technically feasible type of virtual meeting assistant, such as the EVA application from VOICERA, INC.

Dial-in infrastructure networks 140 may be any technically feasible network or set of interconnected communication links that enable the interactive virtual meeting assistant 132, as executed by processor 120, to participate in a meeting with one or more meeting participants 150(0) to 150(m). In various embodiments, the dial-in infrastructure networks 140 may include, without limitation, one or more telephone line connections or one or more computer connections, such as a local area network (LAN), wide area network (WAN), the World Wide Web, or the Internet, among others. The dial-in infrastructure networks 140 may also enable the interactive virtual meeting assistant 132 to access other information via the networks, such as by accessing information via the World Wide Web, or the Internet, among others.

Meeting participants 150(0) to 150(m) represent one or more human and/or computer participants in a meeting environment. Each of the one or more meeting participants 150(0) to 150(m) may be connected to other meeting participants and the interactive virtual meeting assistant 132, as executed by processor 120, via any technically feasible device that forms a connection to other meeting participants, such as a telephone, smartphone, computing device, or personal data assistant, among others. The connections linking the meeting participants 150(0) to 150(m) may be any technically feasible communication link(s), including, without limitation, communication links included in the dial-in infrastructure networks 140, and/or one or more other external communication links, including, without limitation, one or more telephone line connections or one or more computer connections, such as a local area network (LAN), wide area network (WAN), the World Wide Web, or the Internet, among others.

Although FIG. 1 shows the interactive virtual meeting assistant 132 stored in the memory 130 of the computing device 110, in alternative embodiments, the interactive virtual meeting assistant 132 may be stored in-part or entirely in the memory 130 and/or any technically feasible memory device internal to or external to the computing device 110, including any memory device coupled to the computing device 110 through a wired connection, a wireless connection, a network connection, and so forth.

As described in greater detail below in conjunction with FIGS. 2-4B, the interactive virtual meeting assistant 132 receives an invitation to participate in a meeting environment, parses text information included in or derived from the invitation to determine meeting information necessary for the interactive virtual meeting assistant 132 to join the meeting, and either joins the meeting based on the meeting information determined from parsing the received text information, or returns an error message indicating that the meeting information could not be correctly determined from parsing the received text information.

Interactive Virtual Meeting Assistant

Figure 2:
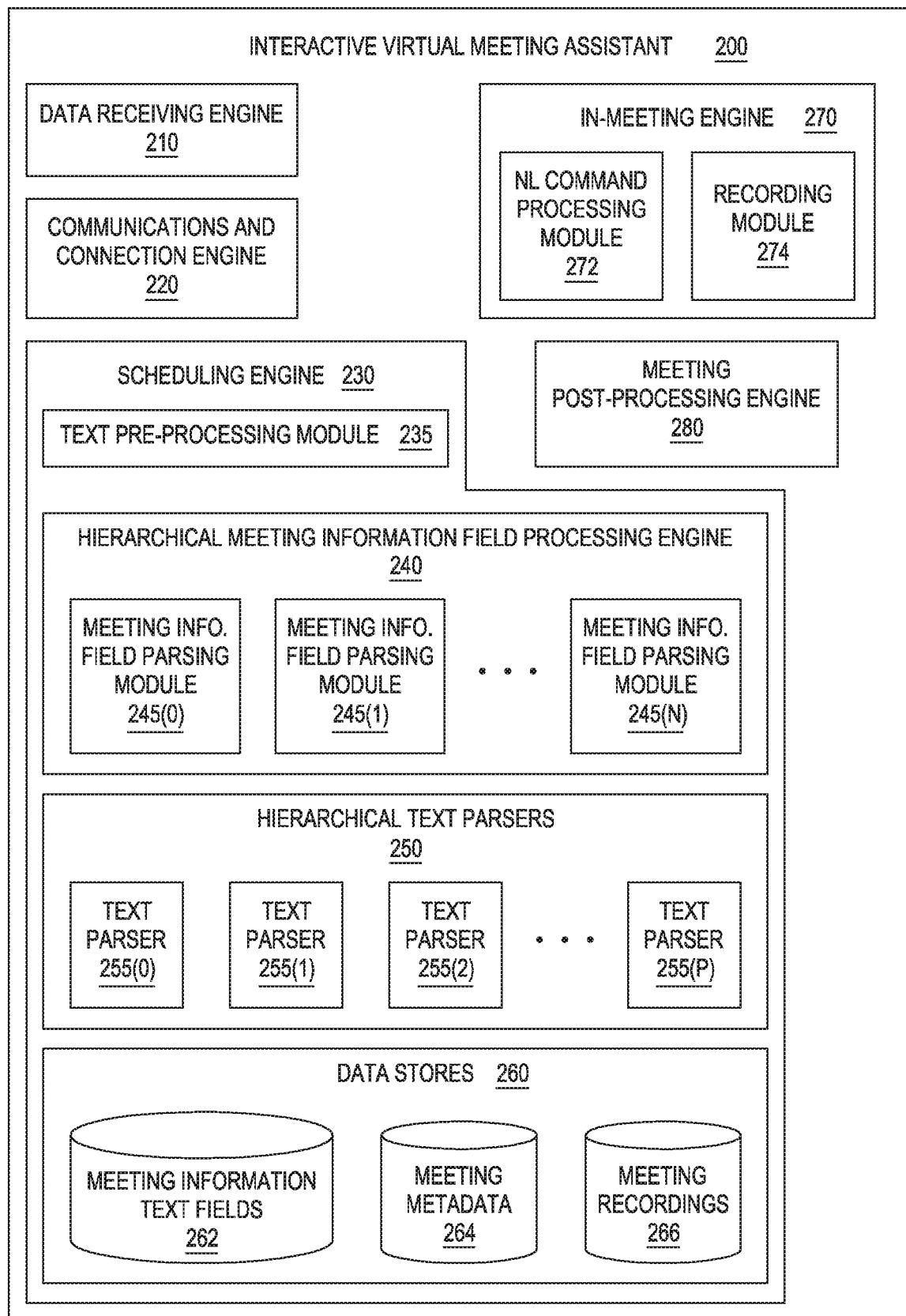
FIG. 2 is a more detailed illustration of the interactive virtual meeting assistant of FIG. 1, according to various embodiments of the present disclosure.

FIG. 2 illustrates interactive virtual meeting assistant 200, which is a more detailed illustration of the interactive virtual meeting assistant 132 of FIG. 1, according to various embodiments of the present disclosure. As shown, interactive virtual meeting assistant 200 includes, without limitation, a data receiving engine 210, a communications and connection engine 220, a scheduling engine 230, data stores 260, an in-meeting engine 270, and a meeting post-processing engine 280.

Data receiving engine 210 may receive data from a user requesting to integrate the interactive virtual meeting assistant 200 into a meeting environment. Types of data received from the user via the data receiving engine 210 may include, without limitation, a telephone call or other voice information received from the user, text or other data received from the user via a website associated with the interactive virtual meeting assistant 200, text or other data received from the user via an application associated with the interactive virtual meeting assistant 200, or an email or other message containing text information received from the user, among others.

Communications and connection engine 220 may then perform actions to connect the interactive virtual meeting assistant 200 to the meeting environment, via the dial-in infrastructure networks 140, based on the data received from the user via the data receiving engine 210. In various embodiments, data may be received via the data receiving engine 210 to cause the communications and connection engine 220 to integrate the interactive virtual meeting assistant 200 into a meeting environment substantially immediately. In other embodiments, data may be received via the data receiving engine 210 to cause the communications and connection engine 220 to integrate the interactive virtual meeting assistant 200 into a meeting environment at a later scheduled time.

In various embodiments, data received via the data receiving engine 210 for integrating the interactive virtual meeting assistant 200 into a meeting immediately may include data received via a voice connection, via a website connection, or via another form of application, among others. In circumstances where the interactive virtual meeting assistant 200 is to be integrated into the meeting environment immediately, the interactive meeting assistant 200 may be integrated into the meeting environment using the data received via the data receiving engine 210 without retrieving any additional information about the meeting. For instance, the communications and connection engine 220 may form a connection to integrate the interactive meeting assistant 200 into the meeting environment immediately in response to data associated with the user pushing one or more buttons on a telephone via a telephone connection. In other embodiments, the communications and connection engine 220 may form a connection to integrate the interactive meeting assistant 200 into the meeting environment immediately in response to receiving data via a data connection, such as via a website or via an application, where the received data causes a connection to the meeting environment to be activated.

As described herein, in other embodiments, data may be received via the data receiving engine 210 for inviting the interactive virtual meeting assistant 200 to connect to a meeting at a scheduled time. For instance, the data receiving engine 210 may receive an email via an email inbox, where the data receiving engine 210 may include an email server or may access an external email server to access received emails. In other embodiments, the data receiving engine 210 may receive a message, such as a calendar invitation via a calendar application. In various embodiments, the received emails or messages may include information about how to connect to the meeting in a body of a message, as an attachment to the message, and so forth. In various embodiments, the data receiving engine 210 may receive a message or other data signal via any kind of application or data connection. The received data, including an email, message, attachment, or other data signal, may include text information in any kind of electronic format, such as hypertext markup language (HTML), plaintext, or any other kind of data that represents text in electronic form, among others.

For voice data received via a telephone connection or other voice connection, the data receiving engine 210 may convert the received voice data into text via a voice-recognition mechanism (not shown) for converting voice to text information. Such voice recognition mechanisms would be well-understood by persons of skill in the art and are not described in further detail herein.

In various embodiments, for data received via the data receiving engine 210 that incudes text information or is converted into text information, such as voice data converted into text via a voice-recognition mechanism, the text information may include text that is formatted according to a predetermined format. In alternative embodiments, the text information may include text that is free-form, e.g., as written by a user, and does not follow any predetermined format.

In circumstances where the interactive virtual meeting assistant 200 is to be integrated into the meeting environment at a scheduled time, the scheduling engine 230 may parse the received data to determine information about the meeting. Such information includes, without limitation, the scheduled time of the meeting, the date of the meeting, the location of the meeting, a description of the meeting, a title or summary of the meeting, an inviter or organizer of the meeting, and so forth. For instance, determining the scheduled time and location of the meeting enables the communications and connection engine 220 to connect the interactive virtual meeting assistant 200 to the meeting environment at the scheduled time and location.

As shown, the scheduling engine 230 includes, without limitation, a text pre-processing module 235, a hierarchical meeting information field parsing engine 240, and hierarchical text parsers 250.

The text pre-processing module 235 may receive the text information from the data receiving engine 210 and perform one or more pre-processing operations. The per-processing operations may transform the text information to normalize and place the information into a standardized format that can be recognized by the text parsing mechanisms included in the scheduling engine 230. For instance, text information that is represented in different electronic forms may be converted into the same electronic form to allow the text information to be parsed uniformly. Such text pre-processing mechanisms would be well-understood by persons of skill in the art and are not described in further detail herein.

In various embodiments, the hierarchical meeting information field parsing engine 240 (also referred to as the "field parsing engine 240") may receive the pre-processed text information from the text pre-processing module 235 and parse the received pre-processed text information to determine information about the meeting. Initially, the field parsing engine 240 may parse the received pre-processed text information to determine that the text information in fact relates to a meeting. In various embodiments, the field parsing engine 240 may determine that the received text information was received in an attachment that meets a predetermined format or protocol applicable to meeting or calendar information. In other embodiments, the field parsing engine 240 may parse the received text information to determine that the text information is formatted according to a predetermined format or protocol that is applicable to meeting or calendar information. In other embodiments, the field parsing engine 240 may parse the received text information to determine that the text information includes predetermined keywords related to meeting information. The field parsing engine 240 may parse the received text information to determine that the text information relates to meeting information in any technically feasible manner.

Subsequently, the field parsing engine 240 may parse different fields of meeting information in a hierarchical manner. For instance, the field parsing engine 240 may include separate meeting information field parsing modules 245(0) to 245(n) for hierarchically parsing each of the different fields of meeting information.

In various embodiments, these multiple different meeting information field parsing modules 245(0) to 245(n) may be executed in accordance with a predetermined hierarchy. For instance, a first meeting information field parsing module 245(0) may be executed first to cause the text information to be parsed to determine information related to how the interactive virtual meeting assistant 200 may join the meeting. In various embodiments, a second meeting information field parsing module 245(1) may be executed next to cause the text information to be parsed to determine information related to a description of the meeting. In various embodiments, a further meeting information field parsing module 245(2) may be executed subsequently to cause the text information to be parsed to determine information related to a summary or title of the meeting. In various embodiments, a further meeting information field parsing module 245(n) may be executed subsequently to cause the text information to be parsed to determine information related to an inviter or organizer of the meeting. In other embodiments, the multiple different meeting information field parsing modules 245(0) to 245(n) may be executed in any predetermined order.

For instance, the information related to how the interactive virtual meeting assistant 200 may join the meeting is useful for enabling the interactive virtual meeting assistant 200 to connect to the meeting. In addition, the information related to the description, summary, title, or the inviter or organizer of the meeting may be useful for the interactive virtual meeting assistant 200 to inform or remind users about the meeting, such as via the communications and connection engine 220.

In various embodiments, the first meeting information field parsing module 245(0) may cause the received text information to be parsed to determine how the interactive virtual meeting assistant 200 may join the meeting. For instance, the meeting information to be parsed may include a time and/or location of the meeting. In various embodiments, the meeting information to be parsed may include a telephone number and/or telephone extension which the interactive virtual meeting assistant 200 may call to join a meeting by telephone. In other embodiments, the meeting information to be parsed may include a uniform resource locator (URL) or other website information to identify a website which the interactive virtual meeting assistant 200 may access to join the meeting via a network connection. In other embodiments, the meeting information to be parsed may include a physical location of the meeting, which the interactive virtual meeting assistant 200 may use to connect to the meeting. For instance, the meeting information may include an address of an office building and conference room number where the meeting will take place, and the interactive virtual meeting assistant 200 may look up a telephone number or network address associated with the specified conference room. In various embodiments, the interactive virtual meeting assistant 200 may look up the telephone number or network address stored locally within the memory 130, or by accessing the telephone number via an external network connection accessed through the dial-in infrastructure networks 140, such as by accessing the World Wide Web or the Internet, among others.

In various embodiments, the meeting information to be parsed may include any additional information enabling the interactive virtual meeting assistant 200 to join the meeting environment, such as any passcodes, passwords, or meeting identification codes, and so forth. In addition, the meeting information to be parsed may include network or telephone service information to be used to connect the interactive virtual meeting assistant 200 to the meeting. For instance, a particular network or telephone service may use specified network protocols or a specified type of telephone connection, and the interactive virtual meeting assistant 200 will use this specified service information to be able to connect to the meeting.

In various embodiments, the meeting information to be parsed may include information about the user or party that sent the request for the interactive virtual meeting assistant 200 to join the meeting. For instance, a particular user or party may be associated with specified network protocols or a specified type of telephone connection, and the interactive virtual meeting assistant 200 will use these specified settings associated with the user or party that sent the meeting request to be able to connect to the meeting.

In various embodiments, after the first meeting information field parsing module 245(0) causes the received text information to be parsed to determine how the interactive virtual meeting assistant 200 may join the meeting, the second meeting information field parsing module 245(1) may be executed to cause the text information to be parsed to determine information related to a description of the meeting. For instance, the information related to the description of the meeting may be any technically feasible type of information describing the meeting, such as, without limitation, the expected duration of the meeting, the expected number of participants in the meeting, whether there will be any breaks in the meeting, whether any refreshments will be provided at the meeting, or any materials to be presented or discussed in the meeting, and so forth.

As discussed herein, the information determined by the second meeting information field parsing module 245(1) may be assigned a lower priority than the meeting information previously determined by the first meeting information field parsing module 245(0), where the meeting information previously determined by the first meeting information field parsing module 245(0) takes precedence over the meeting description information determined by the second meeting information field parsing module 245(1). For instance, the description of the meeting may list multiple different dates and/or times, such as relating to a schedule that is unrelated to the date or time of the meeting. In this case, these multiple different dates and/or times may not be related to the time of the meeting. Accordingly, the meeting information related to the date and time determined by the first meeting information field parsing module 245(0) takes precedence over any data and/or time information that is included in the description of the meeting.

In various embodiments, a further meeting information field parsing module 245(2) may be executed subsequently to cause the text information to be parsed to determine information related to a summary or title of the meeting. For instance, the information related to the summary or title of the meeting may be any technically feasible type of title or summary of the meeting, such as, without limitation, one or more topics expected to be discussed in the meeting, or the scope of the meeting, and so forth.

In various embodiments, a further meeting information field parsing module 245(n) may be executed subsequently to cause the text information to be parsed to determine information related to the party that invited the interactive virtual meeting assistant 200 to the meeting environment, also referred to as the inviter. The inviter may be considered the owner of the meeting. The further meeting information field parsing module 245(n) may include logic for determining the inviter or owner of the meeting. For instance, the received text information may be received in the form of an email message, where the email message includes a file as an attachment that complies with a particular meeting information format or protocol. In such circumstances, the owner of the meeting may be determined from the attached file. For such an attachment, the attached file may include, without limitation an "organizer" field indicating the organizer or owner of the meeting, and a "sent by" field indicating the party that sent the invitation to the meeting. The further meeting information field parsing module 245(n) may then determine that the owner of the meeting is the party identified in the "organizer" field. If the attached file does not include an "organizer" field, the further meeting information field parsing module 245(n) may determine that the owner of the meeting is the party identified in the "sent by" field. Accordingly, the "organizer" and "sent by" fields may be parsed in priority order, giving a higher priority to the "organizer" field. For instance, the owner of the meeting may be identified in the "organizer" field, whereas a third party, such as an administrator or an assistant to the owner of the meeting, may be the party that actually sends the email with the attached fie.

In other embodiments, for cases where there is no file attached to the email or insufficient information included in the attached file, the email itself may include one or more fields relating to the party that sent the email message. For instance, the email message may include, without limitation, a "reply-to" field, a "sender" field, and a "from" field, among others. Similar to the case of the "organizer" and "sent by" fields within the attached file, the "reply-to," "sender," and "from" fields may be parsed in priority order, giving top priority to the "reply-to" field, next priority to the "sender" field, and lower priority to the "from" field. The "reply-to" field indicates where replies to the email are directed, which is likely to be the owner of the meeting. The "sender" or "from" fields may indicate the account from which the email was sent, which is not necessarily the account of the owner of the meeting. The "sender" or "from" fields may indicate the account of an email administrator or an assistant to the owner of the meeting. Accordingly, the further meeting information field parsing module 245(n) may cause the received text information to be parsed to identify the owner of the meeting.

By parsing different text fields of meeting information in a hierarchical manner, the likelihood of efficiently finding meeting information, also referred to as a text match, is increased. For instance, a first text field related to how the interactive virtual meeting assistant 200 may join the meeting may be given a top place in the hierarchy of different text fields as the text field enables the interactive virtual meeting assistant 200 to join the meeting. In addition, the information enabling the interactive virtual meeting assistant 200 to join the meeting may also have the highest probability of including information related to the time and location of the meeting. In various embodiments, if the text parsing process is stopped before all of the meeting information field parsing modules 245(0) to 245(n) have completed, then the interactive virtual meeting assistant 200 may nonetheless still be able to join the meeting if the first meeting information field parsing module 245(0) parses the information necessary for the interactive virtual meeting assistant 200 to join the meeting, since this first meeting information field parsing module 245(0) is executed first as a top priority.

In various embodiments, for each of the multiple different meeting information field parsing modules 245(0) to 245(n), the interactive virtual meeting assistant 200 applies hierarchical text parsers 250 in a hierarchical manner. Specifically, for each of the multiple different meeting information field parsing modules 245(0) to 245(n), the interactive virtual meeting assistant 200 applies each of multiple different text parsers 255(0) to 255(p) in a predetermined order, according to a predetermined hierarchy of text parsers.

In various embodiments, the multiple different text parsers 255(0) to 255(p) may be arranged in a particular order according to a hierarchy. For instance, the text parsers 255(0) to 255(p) may be arranged in order of probability of finding a text match. In other embodiments, the text parsers 255(0) to 255(p) may be arranged according to any technically-feasible hierarchy.

Accordingly, when executing a first meeting information field parsing module 245(0), the hierarchy of multiple different text parsers 255(0) to 255(p) are applied in the predetermined order to parse the received text information for the first text field. Subsequently, when executing a next meeting information field parsing module 245(1), the hierarchy of multiple different text parsers 255(0) to 255(p) are applied in the predetermined order to parse the received text information for the next text field. This process is repeated for each of the multiple different text fields to be parsed using the multiple different meeting information field parsing modules 245(0) to 245(n).

In various embodiments, this process of executing each of the multiple different meeting information field parsing modules 245(0) to 245(n) in a hierarchical manner, by applying each of the multiple different text parsers 255(0) to 255(p) in a hierarchical manner, may be viewed as a large loop, including an outer loop and an inner loop. For each iteration of the outer loop, one of the multiple different meeting information field parsing modules 245(0) to 245(n) is executed to parse a particular text field by applying the multiple different text parsers 255(0) to 255(p) via the inner loop. Further, for each iteration of the inner loop, one of the multiple different text parsers 255(0) to 255(p) is applied to the received text information for that particular text field of meeting information. Accordingly, once the first meeting information field parsing module 245(0) is executed by applying each of the multiple different text parsers 255(0) to 255(p) via the inner loop, a next meeting information field parsing module 245(1) is executed by applying each of the multiple different text parsers 255(0) to 255(p) via the inner loop. This process is repeated until each of the meeting information field parsing modules 245(0) to 245(n) have been executed.

In various embodiments, each of the multiple different text parsers 255(0) to 255(p) may be applied to parse different characteristics in the text information, such as different terms, phrases, dictates, patterns, or templates, among others. For instance, one or more of the multiple different text parsers 255(0) to 255(p) may implement a rule-based approach, where if particular text information is found, then the text parser applies certain rules, patterns, or templates in parsing the remaining text information.

In various embodiments, each of the multiple different text parsers 255(0) to 255(p) may output the value of the parsed text match and a quality indicator that indicates a quality of the text match. The text match and the quality indicator output by one of the multiple different text parsers 255(0) to 255(p) may be temporarily stored as part of the interactive virtual meeting assistant 200, such as in data stores 260, stored at another location in the memory 130, or stored in an external memory accessed via the dial-in infrastructure networks 140. In some embodiments, the quality indicator may be a quality score indicating the quality of the text match, a quality score indicating a probability that the text match includes actual meeting information, or any technically feasible indicator of the quality of the text match.

In various embodiments, the quality indicator output by a particular one of the text parsers 255(0) to 255(p) may indicate that the text match is a preferred match. For instance, a quality indicator may indicate a probability value indicating a confidence that the text match represents actual meeting information. In such circumstances, the probability value may be equal or substantially equal to a maximum confidence that the text match represents actual meeting information. In various embodiments, when the quality indicator output by a particular one of the text parsers 255(0) to 255(p) indicates that the text match is a preferred match, the text parsing process returns the value of the preferred match and the quality indicator, without applying any additional text parsers included in the text parsers 255(0) to 255(p). In various embodiments, the text parsing process may be viewed as exiting the inner loop for the current iteration of the outer loop associated with one of the meeting information field parsing modules 245(0) to 245(n), without applying any additional text parsers included in the text parsers 255(0) to 255(p).

In various embodiments, a first text parser 255(0) may be a service specific parser that determines if the received text information is associated with a particular type of meeting service. For instance, the type of meeting service may be associated with a particular application or a particular provider's meeting connection service. For example, the first text parser 255(0) may determine if the received text information includes certain keywords, expressions, service names, URL's, and so forth, that indicate that the meeting information complies with a particular meeting service. For example, the received text information may include, without limitation, general URL's associated with the particular service, or one or more URL links associated with the particular service that allow the interactive virtual meeting assistant 200 to directly join the meeting.

The first text parser 255(0) may then determine that the received text information has a predetermined format that is associated with the particular type of meeting service found to be applicable to the received text. For instance, certain emails or data messages associated with a particular service may have text information arranged according to a predetermined format. Accordingly, based on the known predetermined format, the first text parser 255(0) may determine that certain bit fields of the received text information contain a predetermined type of information, such as where certain bit fields may represent the time of the meeting, other bit fields may represent the location of the meeting, and so forth. Once the text information is determined to have a certain predetermined format, the first text parser 255(0) may be able to parse the text information more easily, since the first text parser 255(0) will know where within the text information to look for certain text fields of the meeting information. Accordingly, once the first text parser 255(0) parses the text associated with a particular service, the first text parser 255(0) may cause the parsed text match and a quality indicator to be stored in the data stores 260, in the memory 130, or other memory, as described herein.

In various embodiments, one or more service specific text parsers may be placed at the top of the hierarchy of text parsers and given priority over other text parsers. Once the text parser determines that the received text information is associated with a particular type of meeting service and has a particular predetermined format, the text parsing would likely yield a high-quality text match, since the received text information has a known format. For instance, the first text parser 255(0) may produce a high-quality text match that is a preferred match, in which case the text parsing process may exit the inner loop without requiring any further text parsers 255(1) to 255($p$) to be applied.

In other embodiments, the first text parser 255(0) may determine that the received text information is associated with a particular meeting service, but that not all of the text fields of the received text information comply with a predetermined format. For instance, certain fields of the received text information may have a known format, while other fields do not have a known format and are parsed in a free-form manner. In such circumstances, the first text parser 255(0) may act as a natural language text parser to parse the text fields that do not have a known format in a free-form manner, such as where the received text information is written by a user.

In various embodiments, a further text parser 255(1) may be a single-tapped number parser that parses the received text information one character at a time to determine any numerical digits included in the received text information. Determining any numerical digits is useful in examples of telephone numbers, telephone extensions, addresses, room numbers, and so forth. For instance, the received text information may include complex text strings in which numerical digits are separated by commas or semi-colons, or the like. Using a single-tapped number parser to parse the numerical digits from such complex text strings enables the numbers to be parsed without any intervening spacing characters. Accordingly, once the further text parser 255(1) parses the text associated with the numerical digits, the further text parser 255(1) may cause the parsed text match and a quality indicator to be stored in the data stores 260, in the memory 130, or other memory, as described herein.

In various embodiments, a further text parser 255(2) may be a natural language parser that parses the received text information in a free-form manner. Such a natural language parser may act as a fallback option for parsing text information that does not have a known format. Accordingly, once the further text parser 255(2) parses the text in the free-form manner, the further text parser 255(2) may cause the parsed text match and a quality indicator to be stored in the data stores 260, in the memory 130, or other memory, as described herein.

In various embodiments, a further text parser 255($p$) may be a parser that parses the received text information based on learning from past text parsing of similar text information. The further text parser 255($p$) may include a learning component that is updated after each text parsing by creating rules for parsing the receiving text information. For instance, the received text information may have a first format, where the text parsing finds that certain patterns or structures are characteristic of the meeting information in this first format, and subsequently-received text information may have a second format, where the text parsing finds that finds that certain patterns or structures are characteristic of the meeting information in this second format. These different patterns or structures may be stored in the text parser 255($p$) as rules for parsing future text information, to enable the text parsers to be able to parse the meeting information more efficiently. In other embodiments, the further text parser 255($p$) may analyze these detected patterns or structures using a machine-learning algorithm or any other type of artificial intelligence for optimizing the text parsing mechanisms for recognizing meeting information in the received text information.

In various embodiments, this learning component used for optimizing the text parsing mechanisms may be included in the further text parser 255($p$), may be included in the interactive virtual meeting assistant 200 as a separate module or engine (not shown), may be executed as a separate application stored in the memory 130, may be integrated into each of the text parsers 255(0) to 255($p$), or may be implemented in any other technically-feasible manner. Accordingly, once the further text parser 255($p$) parses the text according to the learning mechanisms, the further text parser 255($p$) may cause the parsed text match and a quality indicator to be stored in the data stores 260, in the memory 130, or other memory, as described herein.

As noted above, one of the text parsers 255(0) to 255($p$) may parse text that is determined to be a preferred match, as described herein. For instance, when the quality indicator is a probability score indicating a confidence level that the parsed text represents actual meeting information, the probability score may be equal to 1, indicating a maximum confidence level that the parsed text represents actual meeting information. When the quality indicator indicates that the parsed text is a preferred match, the text parsing processes performed by the scheduling engine 230 may exit the inner loop and avoid unnecessarily applying any addition text parsers, thereby increasing the efficiency of the text parsing process. In various embodiments, when the multiple different text parsers are arranged in a hierarchy, such that a higher-priority text parser has a higher probability of finding a preferred match, then applying these multiple different text parsers in the particular order specified by the hierarchy increases efficiency by increasing the probability that a preferred match will be found earlier in the parsing process.

If, however, the quality indicator does not indicate that the determined text match is a preferred match, the scheduling engine 230 causes the remaining text parsers 255(0) to 255(p) to be applied to the received text information to determine additional text matches and corresponding quality indicators. Accordingly, for each text field as parsed by one of the meeting information field parsing modules 245(0) to 245(n), the multiple different text parsers 255(0) to 255(p) generate multiple different text matches and corresponding quality indicators. For instance, one of the meeting information field parsing modules 245(0) to 245(n) represents one iteration of the outer loop, and applying the multiple different text parsers 255(0) to 255(p) represents multiple iterations of the inner loop.

In various embodiments, when multiple iterations of the inner loop generate the multiple different text matches and quality indicators, as described herein, the scheduling engine 230 causes the best text match to be selected. In one embodiment, the scheduling engine causes the best text match to be selected by selecting the text match having the best quality indicator indicating the highest confidence level that the parsed text information represents actual meeting information. This selected text match and the corresponding quality indicator may be stored in the data stores 260, in the memory 130, or other memory, as described herein, to represent the text field of the actual meeting information.

As described herein, in various embodiments, the communications and connection engine 220 may then cause the interactive virtual meeting assistant 200 to join the meeting using the stored meeting information. For instance, the communications and connection engine 220 may use any meeting information that was stored in conjunction with finding a preferred match or any meeting information that was stored in conjunction with selecting the best text match. As described herein, the meeting information may be stored in the data stores 260, in the memory 130, or other memory, and so forth, to represent the different text fields of the actual meeting information. For instance, the communications and connection engine 220 may use stored telephone number information to cause the interactive virtual meeting assistant 200 to join a meeting by telephone, or use stored website information to cause the interactive virtual meeting assistant 200 to join a meeting via a website.

On the other hand, in various embodiments, the selected best text match may have a low quality indicator that indicates that the text match does not meet certain predetermined threshold quality criteria. For instance, when the quality indicator is a probability score indicating a confidence level that the parsed text represents actual meeting information, the selected best probability score may be below a predetermined threshold indicating a low confidence level that the parsed text represents actual meeting information. In such circumstances where the quality indicator does not meet the predetermined threshold criteria, the scheduling engine 230 may determine whether to return an error message to the source of the text information. For instance, if text fields that have low quality indicators are not related to information regarding how the interactive virtual meeting assistant 200 may join the meeting, such as text information related to a summary of the meeting and not related to telephone number or website information needed to dial in to the meeting, the scheduling engine 230 may determine that an error message is not necessary.

On the other hand, when the scheduling engine 230 determines to return an error message, the scheduling engine 230 may cause the communications and connection engine 220 to return an error message to the source of the meeting invitation. For instance, the error message may indicate that the meeting information could not be correctly determined from the received text information. In other embodiments, the error message may request that the user enter the meeting information manually using, for instance, a standardized form.

In various embodiments, the interactive virtual meeting assistant 200 may store information in data stores 260. As shown, data stores 260 include, without limitation, meeting information text field data stores 262, meeting metadata data stores 264, and meeting recording data stores 266.

In various embodiments, meeting information text field data stores 262 may store multiple fields of meeting information that enable the interactive virtual meeting assistant 200 to join the meeting environment. In some embodiments, the meeting information text field data stores 262 may store, for each text field being parsed by one of the meeting information field parsing modules 245(0) to 245(n), the text matches and corresponding quality indicators generated by applying the multiple different text parsers 255(0) to 255(p) to the received text information.

In various embodiments, meeting metadata data stores 264 store information generated during the meeting, as described in further detail herein. In some embodiments, meeting recording data stores 266 store audio and other recordings of the actual meeting environment generated during the meeting, as described in further detail herein.

In addition, the data stores 260 may include any technically feasible other data stores for storing additional information that is generated by or would be useful for the interactive virtual meeting assistant 200. In some embodiments, the data stored in the data store 260 may be stored as part of the interactive virtual meeting assistant 200, or anywhere else in memory 120, or any technically feasible memory, such as an external memory connected to the computer 100 or remotely-accessible by the computer 100.

In various embodiments, the in-meeting engine 270 acts as the engine for controlling the interactive virtual meeting assistant 200 during the meeting. As shown, the in-meeting engine 270 includes a natural language command processing module 272 and a recording module 274.

In various embodiments, the natural language command processing module 272 may process commands spoken by the meeting participants 150(0) to 150(m) to cause the interactive virtual meeting assistant 200 to perform some meeting-related action. For instance, for a meeting application, one of the meeting participants 150(0) to 150(m) may speak a command, such as a command beginning with a pre-determined phrase. Subsequently, the meeting participant may speak details of a command to cause the interactive virtual meeting assistant 200 to perform a meeting related action, such as making a note, memorializing an action item, and so forth.

In various embodiments, the recording module 274 may record meeting metadata resulting from these commands by the meeting participants 150(0) to 150(m) into the meeting metadata data stores 264. For instance, the meeting metadata may include the notes or action items generated during the meeting, such as an action item to send a particular email, to generate a reminder about a deadline, and so forth. In some embodiments, the recording module 274 may also record the actual meeting, such as an audio or video recording of the meeting, into the meeting recordings data stores 266.

In various embodiments, the meeting post-processing engine 280 may perform processing actions on the meeting metadata stored in the meeting metadata stores 264 and on the meeting recordings stored in the meeting recordings data stores 266. For instance, the meeting post-processing engine 280 may perform actions related to the notes or action items generated during a meeting, such as by sending an email or a reminder as specified in an action item, as so forth. In addition, the meeting post-processing engine 280 may perform post-processing actions on the meeting recordings stored in the meeting recordings data stores 266, such as data analysis on the recorded data.

Figure 3:
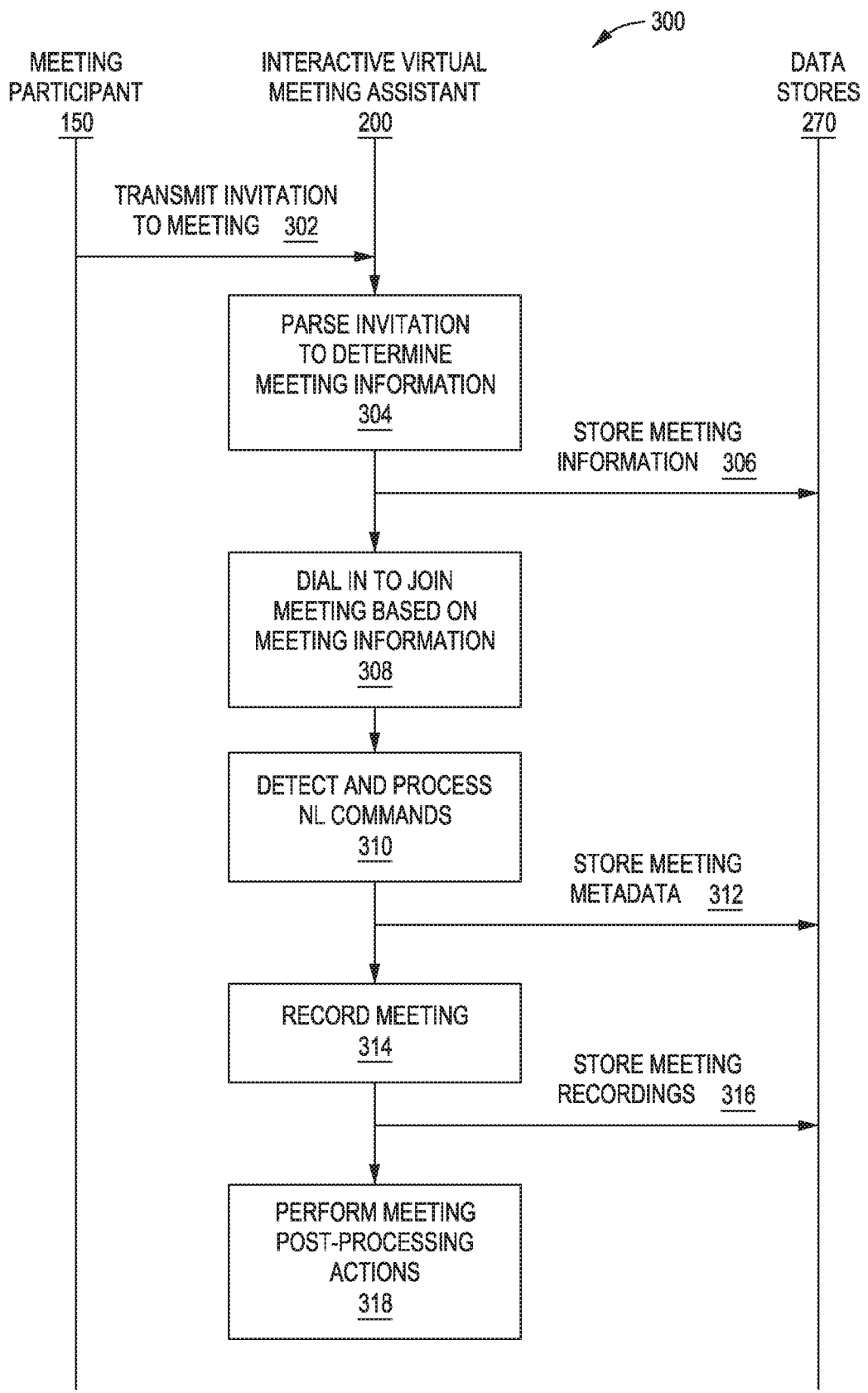
FIG. 3 is a timing diagram illustrating actions performed by a meeting participant and the interactive virtual meeting assistant to integrate the interactive virtual meeting assistant into a meeting environment, according to various embodiments of the present disclosure.

FIG. 3 is a timing diagram illustrating actions performed by a meeting participant 150 and the interactive virtual meeting assistant 200 to cause the interactive virtual meeting assistant 200 to be integrated into a meeting environment. Although the actions performed are described in conjunction with FIGS. 1 and 2, persons skilled in the art will understand that any system configured to perform the method steps, in any order, falls within the scope of the present disclosure.

As shown, a timing diagram 300 begins at step 302, where one of the meeting participants 150(0) to 150(m) transmits an invitation to the interactive virtual meeting assistant 200 to cause the interactive virtual meeting assistant 200 to be integrated into the meeting environment. As described herein, the interactive virtual meeting assistant 200 may include a data receiving engine 210 for receiving data in the form of the invitation requesting to integrate the interactive virtual meeting assistant 200 into the meeting environment. As described herein, the invitation may include data that includes text information or includes information from which text information may be derived, including, without limitation, data in the form of a telephone call or other voice information received from the user, text or other data received from the user via a website associated with the interactive virtual meeting assistant 200, text or other data received from the user via an application associated with the interactive virtual meeting assistant 200, or an email or other message containing text information received from the user, among others.

At step 304, the interactive virtual meeting assistant 200 parses the data included in the received invitation to determine information about the meeting that enable the interactive virtual meeting assistant 200 to join the meeting. In various embodiments, as described herein, the interactive virtual meeting assistant 200 may include a scheduling engine 230 for parsing the text information included in or derived from the received information. As described herein, the interactive virtual meeting assistant 200 may include a text pre-processing engine 235 for performing one or more pre-processing operations to ensure that the text information is normalized and placed into a standardized format that can be recognized by the text parsing mechanisms included in the scheduling engine 230.

In various embodiments, the scheduling engine 230 may cause the field parsing engine 240 to parse different fields of meeting information in a hierarchical manner. For instance, the field parsing engine 240 may include separate meeting information field parsing modules 245(0) to 245(n) for hierarchically parsing each of the different fields of meeting information in a predetermined order, in accordance with a predetermined hierarchy. In some embodiments, a first meeting information field parsing module 245(0) in the hierarchy may be executed to cause the text information to be parsed to determine information related to how the interactive virtual meeting assistant 200 may join the meeting. Other meeting information field parsing modules 245(1) to 245(n) in the hierarchy may be executed to parse information about a description of the meeting, a summary of the meeting, an inviter or organizer of the meeting, and so forth. In various embodiments, the multiple different meeting information field parsing modules 245(0) to 245(n) may be executed in any predetermined order.

In various embodiments, for each of the multiple different meeting information field parsing modules 245(0) to 245(n), the scheduling engine 230 of the interactive virtual meeting assistant 200 applies hierarchical text parsers 250 in a hierarchical manner. Specifically, for each of the multiple different meeting information field parsing modules 245(0) to 245(n), the interactive virtual meeting assistant 200 applies each of multiple different text parsers 255(0) to 255(p) in a predetermined order, according to a predetermined hierarchy of text parsers. For instance, the text parsers 255(0) to 255(p) may be arranged in order of probability of finding a text match. In other embodiments, the text parsers 255(0) to 255(p) may be arranged according to any technically-feasible hierarchy.

In various embodiments, when executing a first meeting information field parsing module 245(0), the hierarchy of multiple different text parsers 255(0) to 255(p) are applied in the predetermined order to parse the received text information for the first text field. Subsequently, when executing a next meeting information field parsing module 245(1), the hierarchy of multiple different text parsers 255(0) to 255(p) are applied in the predetermined order to parse the received text information for the next text field. This process is repeated for each of the multiple different text fields to be parsed using the multiple different meeting information field parsing modules 245(0) to 245(n).

In various embodiments, each of the multiple different text parsers 255(0) to 255(p) may output the value of the generated text match and a quality indicator that indicates a quality of the text match. For instance, the quality indicator may be a quality score indicating the quality of the text match, a quality score indicating a probability that the text match includes actual meeting information, or any technically feasible indicator of the quality of the text match. In various embodiments, the quality indicator may indicate that the generated text match is a preferred match. In such circumstances, the text parsing process return the value of the preferred match and the quality indicator, without applying any additional text parsers included in the text parsers 255(0) to 255(p). In various embodiments, the text parsing process may be viewed as exiting the inner loop for the current iteration of the outer loop associated with one of the meeting information field parsing modules 245(0) to 245(n), without applying any additional text parsers included in the text parsers 255(0) to 255(p).

On the other hand, if the quality indicator does not indicate that the determined text match is a preferred match, the scheduling engine 230 causes the remaining text parsers 255(0) to 255(p) to be applied to the received text information to determine additional text matches and corresponding quality indicators. Accordingly, for each text field as parsed by one of the meeting information field parsing modules 245(0) to 245(n), the multiple different text parsers 255(0) to 255(p) generate multiple different text matches and corresponding quality indicators. In such circumstances, the scheduling engine 230 causes the best text match to be selected, by selecting the text match which has the best quality indicator indicating the highest confidence level that the parsed text information represents actual meeting information. This selected best text match and the corresponding quality indicator may be stored in the data stores 260, in the memory 130, or other memory, as described herein, to represent the text field of the actual meeting information.

At step 306, the interactive virtual meeting assistant 200 causes the parsed meeting information to be stored in data stores 260. For instance, the scheduling engine 230 of the interactive virtual meeting assistant 200 may cause the meeting information to be stored in meeting information text field data stores 262, where the meeting information may include text matches that are preferred matches or selected best text matches based on quality indicators indicating the quality of the text matches. In various embodiments, a text match that qualifies as a preferred match may be stored in the meeting information text field data stores 262. In some embodiments, when multiple different text matches are generated by applying multiple different text parsers 255(0) to 255(p) for a given text field, a text match that has a highest quality indicator may be selected as the best text match for this given text field, and this selected best text match and corresponding quality indicator may also be stored in the meeting information text field data stores 262.

At step 308, the interactive virtual meeting assistant 200 joins the meeting environment based on the stored meeting information. In various embodiments, the communications and connection engine 220 may cause the interactive virtual meeting assistant 200 to join the meeting using the stored meeting information, including any meeting information that was stored in conjunction with finding a preferred match or any meeting information that was stored in conjunction with selecting the best text match. For instance, the communications and connection engine 220 may use stored telephone number information to cause the interactive virtual meeting assistant 200 to join a meeting by telephone, or use stored website information to cause the interactive virtual meeting assistant 200 to join a meeting via a website.

At step 310, during the meeting, the interactive virtual meeting assistant 200 detects and processes natural language commands given by the meeting participants 150(0) to 150(m). In various embodiments, the interactive virtual meeting assistant 200 may include a natural language command processing module 272 to process commands spoken by the meeting participants 150(0) to 150(m) to cause the interactive virtual meeting assistant 200 to perform some meeting-related action. For instance, the meeting participant may speak details of a command to cause the interactive virtual meeting assistant 200 to perform a meeting related action, such as making a note, memorializing an action item, and so forth.

At step 312, the interactive virtual meeting assistant 200 stores meeting metadata resulting from the natural language commands generated during the meeting. In various embodiments, the interactive virtual meeting assistant 200 may include a recording module 274 for recording meeting metadata resulting from these commands by the meeting participants 150(0) to 150(m) into the meeting metadata data stores 264. For instance, the meeting metadata may include the notes or action items generated during the meeting, such as an action item to send a particular email, to generate a reminder about a deadline, and so forth.

At step 314, the interactive virtual meeting assistant 200 causes the meeting to be recorded. In various embodiments, the interactive virtual meeting assistant 200 may include a recording module 264 for causing an audio and/or video recording of a meeting to be recorded. In some embodiments, the audio and/or video recording may be stored in the meeting recordings data stores 266.

At step 316, the interactive virtual meeting assistant 200 causes the meeting recordings to be stored. In various embodiments, the recording module 264 may cause the audio and/or video recording of a meeting to be recorded, such as in the meeting recordings data stores 266.

At step 318, the interactive virtual meeting assistant 200 causes one or more post-processing actions to be performed based on the stored meeting metadata and/or the stored meeting recordings. In various embodiments, the interactive virtual meeting assistant 200 may include a meeting post-processing engine 280 that performs these meeting post-processing functions on meeting metadata stored in the meeting metadata stores 264, such as by sending an email or a reminder as specified in a note or action item generated during the meeting, and so forth. In addition, in various embodiments, the meeting post-processing engine 280 may perform data analysis or other post-processing operations on audio or video meeting recordings that are stored in meeting recordings data stores 266.

Figure 4A:
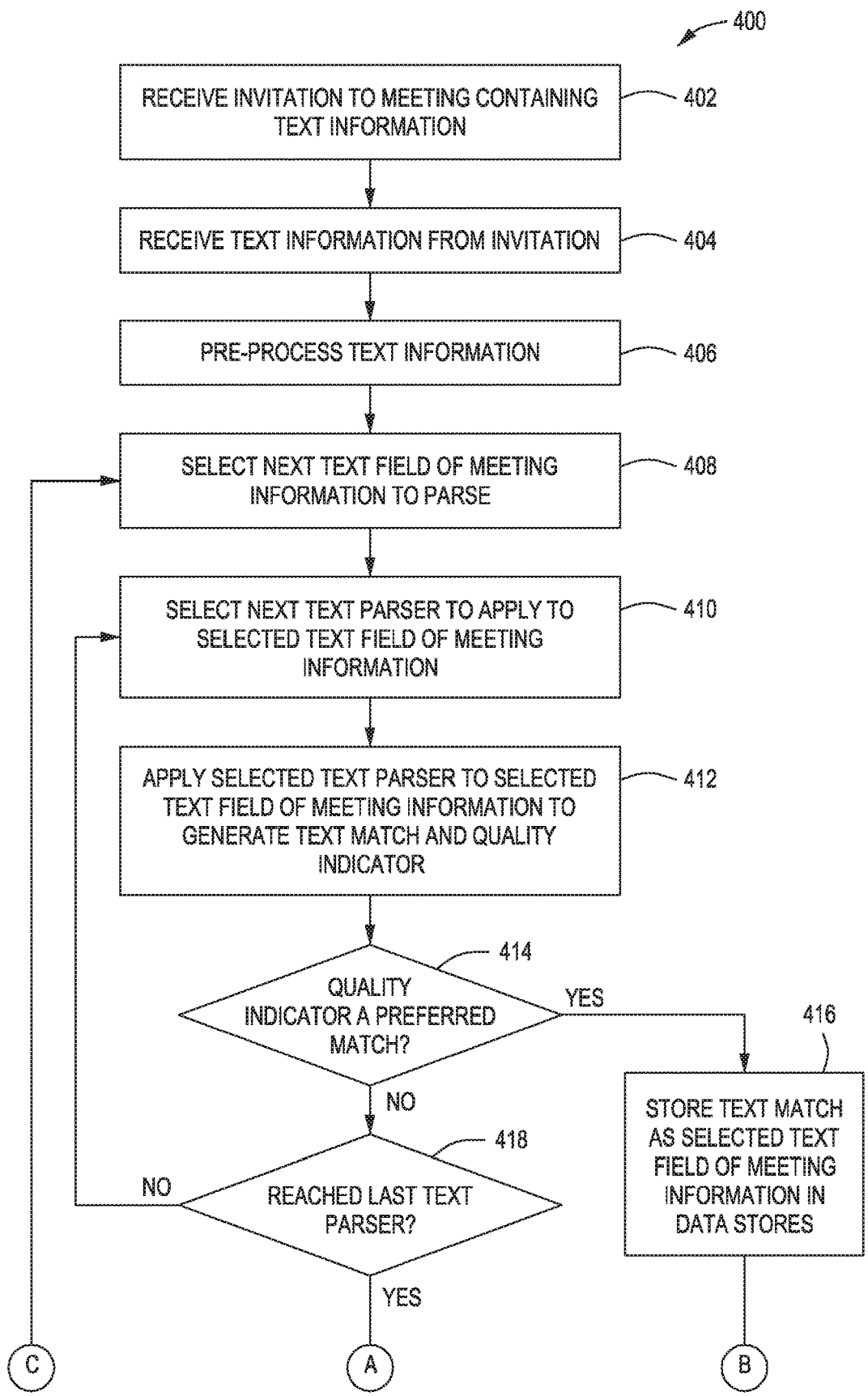
FIGS. 4A-4B collectively illustrate a flow diagram of method steps performed by the interactive virtual meeting assistant, according to various embodiments of the present disclosure.
Figure 4B:
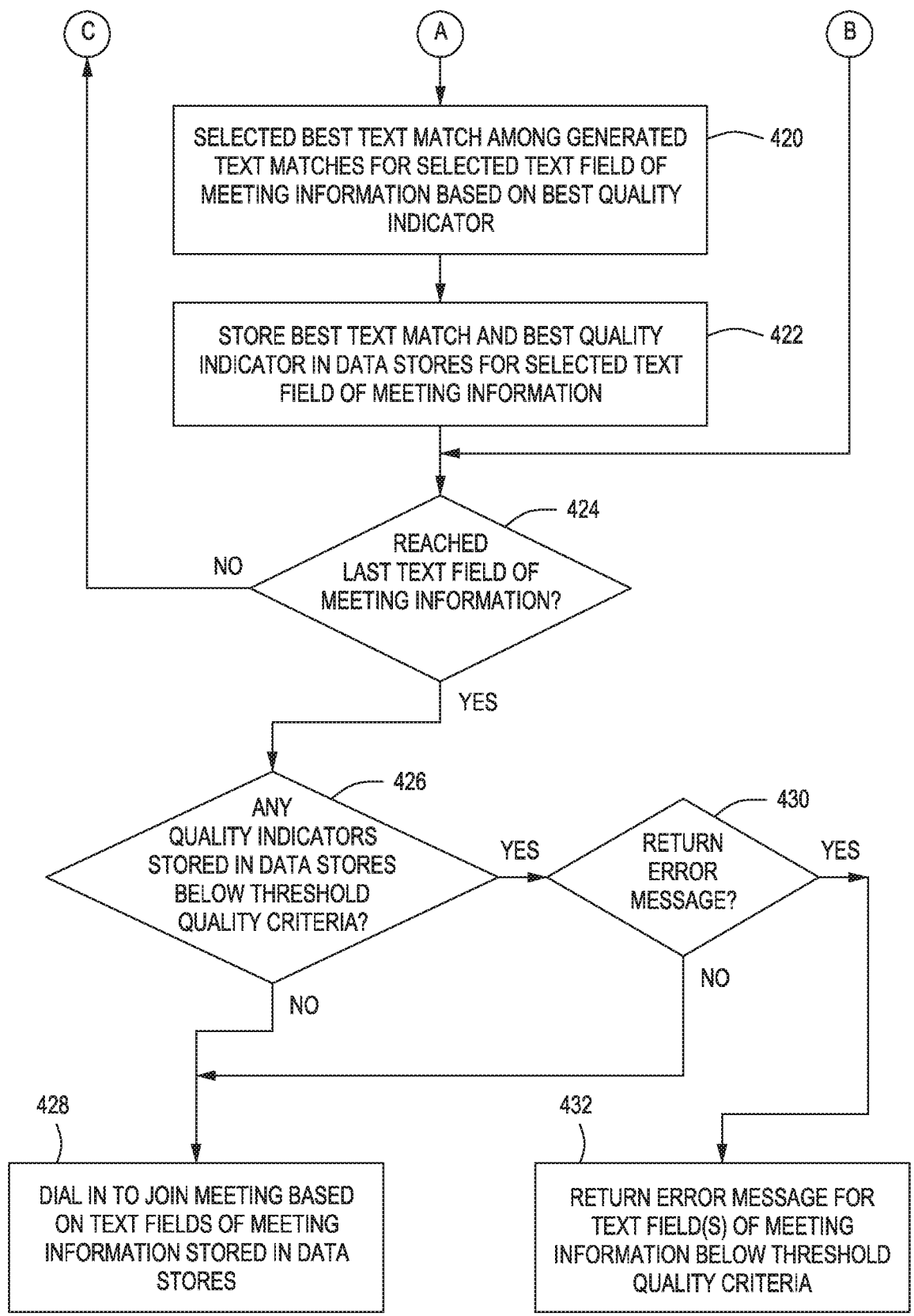

FIGS. 4A and 4B illustrate a flow diagram of method steps performed by the interactive virtual meeting assistant 200 to cause the interactive virtual meeting assistant 200 to be integrated into the meeting environment.

As shown, a flow diagram 400 begins at step 402, the data receiving engine 210 of the interactive virtual meeting assistant 200 receives an invitation from one of the meeting participants 150(0) to 150(m) requesting to integrate the interactive virtual meeting assistant 200 into the meeting environment. As described herein, the invitation may include data that includes text information or includes information from which text information may be derived, including, without limitation, data in the form of a telephone call or other voice information received from the user, text or other data received from the user via a website associated with the interactive virtual meeting assistant 200, text or other data received from the user via an application associated with the interactive virtual meeting assistant 200, or an email or other message containing text information received from the user, among others.

At step 404, the data receiving engine 210 may derive the text information from the received invitation, such as by creating text from the received data in voice form or other electronic form. In various embodiments, the scheduling engine 230 may derive text information from the received invitations.

At step 406, the interactive virtual meeting assistant 200 may include a text pre-processing engine 235 for performing one or more pre-processing operations to ensure that the text information is normalized and placed into a standardized format that can be recognized by the text parsing mechanisms included in the scheduling engine 230.

At step 408, the scheduling engine 230 may cause the field parsing engine 240 to parse different fields of meeting information in a hierarchical manner. In various embodiments, the field parsing engine 240 may include separate meeting information field parsing modules 245(0) to 245(n) for hierarchically parsing each of the different fields of meeting information in a predetermined order, in accordance with a predetermined hierarchy. In some embodiments, a first meeting information field parsing module 245(0) in the hierarchy may be executed to cause the text information to be parsed to determine information related to how the interactive virtual meeting assistant 200 may join the meeting. Other meeting information field parsing modules 245(1) to 245(n) in the hierarchy may be executed to parse information about a description of the meeting, a summary of the meeting, an inviter or organizer of the meeting, and so forth. In various embodiments, the multiple different meeting information field parsing modules 245(0) to 245(n) may be executed in any predetermined order.

More specifically, at step 408, the scheduling engine 230 may cause the field parsing engine 240 to select a next one of the meeting information field parsing modules 245(0) to 245(n) for parsing a next text field of meeting information.

At step 410, for each of the multiple different meeting information field parsing modules 245(0) to 245(n), the scheduling engine 230 applies hierarchical text parsers 250 in a hierarchical manner. Specifically, for each of the multiple different meeting information field parsing modules 245(0) to 245(n), the interactive virtual meeting assistant 200 applies each of multiple different text parsers 255(0) to 255(p) in a predetermined order, according to a predetermined hierarchy of text parsers. For instance, the text parsers 255(0) to 255(p) may be arranged in order of probability of finding a text match. In other embodiments, the text parsers 255(0) to 255(p) may be arranged according to any technically-feasible hierarchy.

More specifically, at step 410, the scheduling engine 230 may cause the next text parser included in the hierarchy of multiple different text parsers 255(0) to 255(p) to be selected, so that the selected text parser is applied to parse the received text information.

In various embodiments, when executing a first meeting information field parsing module 245(0), the hierarchy of multiple different text parsers 255(0) to 255(p) are applied in the predetermined order to parse the received text information for the first text field. Subsequently, when executing a next meeting information field parsing module 245(1), the hierarchy of multiple different text parsers 255(0) to 255(p) are applied in the predetermined order to parse the received text information for the next text field. As described herein, this process is repeated for each of the multiple different text fields to be parsed using the multiple different meeting information field parsing modules 245(0) to 245(n).

At step 412, the selected text parser included in the hierarchy of multiple different text parsers 255(0) to 255(p) is applied to parse the received text information for the text field of meeting information being parsed by the meeting information field parsing module included in the hierarchy of multiple different meeting information field parsing modules 245(0) to 245(n). In various embodiments, the selected text parse may generate a text match for the text field of meeting information and a quality indicator that indicates a quality of the text match. For instance, the quality indicator may be a quality score indicating the quality of the text match, a quality score indicating a probability that the text match includes actual meeting information, or any technically feasible indicator of the quality of the text match.

At step 414, the scheduling engine 230 may determine whether the quality indicator indicate that the generated text match is a preferred match. For instance, a quality indicator may indicate a probability value indicating a confidence that the text match represents actual meeting information. In such circumstances, the probability value may be equal to 1, thus indicating a maximum confidence that the text match represents actual meeting information.

If the scheduling engine 230 determines that the quality indicator indicates that the generated text match is a preferred match, then the process proceeds to step 416. At step 416, the text parsing process returns the value of the preferred match and the quality indicator, without applying any additional text parsers included in the text parsers 255(0) to 255(p). In various embodiments, the text match that constitutes the preferred march may be stored in the meeting information text field data stores 262. In some embodiments, the text parsing process may be viewed as exiting the inner loop for the current iteration of the outer loop associated with one of the meeting information field parsing modules 245(0) to 245(n), without applying any additional text parsers included in the text parsers 255(0) to 255(p).

Returning to step 414, if the scheduling engine 230 determines that the quality indicator does not indicate that the generated text match is a preferred match, the scheduling engine 230 proceeds to step 418. At step 418, the scheduling engine 230 determines whether the selected text parser is the last text parser included in the hierarchy of multiple different text parsers 255(0) to 255(p). If the scheduling engine 230 determines that the selected text parser is not the last text parser included in the hierarchy of multiple different text parsers 255(0) to 255(p), then the text parsing process returns to step 410, where the scheduling engine 230 causes the next text parser to be selected. In various embodiments, the scheduling engine 230 causes the remaining text parsers included in the text parsers 255(0) to 255(p) to be applied to the received text information to determine additional text matches and corresponding quality indicators. Accordingly, for each text field as parsed by one of the meeting information field parsing modules 245(0) to 245(n), the multiple different text parsers 255(0) to 255(p) generate multiple different text matches and corresponding quality indicators.

Returning now to step 418, if the scheduling engine 230 determines that the selected text parser is the last text parser included in the hierarchy of multiple different text parsers 255(0) to 255(p), then the text parsing process proceeds to step 420 via path A. At step 420, the scheduling engine 230 causes the best text match to be selected from among the various text matches generated by the text parsers for the selected one of the meeting information field parsing modules 245(0) to 245(n). In various embodiments, the scheduling engine 230 causes the text match which has the best quality indicator indicating the highest confidence level that the parsed text information represents actual meeting information to be selected as the best text match.

At step 422, this selected best text match and the corresponding quality indicator may be stored in the data stores 260, in the memory 130, or other memory, as described herein, to represent the text field of the actual meeting information. In various embodiments, the text match that constitutes the preferred march may be stored in the meeting information text field data stores 262.

Following the storing of the preferred text match in the data stores in step 416, the text parsing process proceeds to step 424 via path B. Alternatively, following the storing of the selected best text match and the corresponding quality indicator in the data stores in step 422, the text parsing process proceeds to step 424. At step 424, the scheduling engine 230 determines whether the last text field of meeting information has been reached, where the last meeting information field parsing module included in the multiple different meeting information field parsing modules 245(0) to 245(n) has been executed.

If the last text field of meeting information has not been reached, then the text parsing process returns to step 408 via path C, where the next text field of meeting information is selected, such that the next meeting information field parsing module included in the multiple different meeting information field parsing modules 245(0) to 245(n) may be executed. As described herein, this process is repeated for each of the multiple different text fields to be parsed using the multiple different meeting information field parsing modules 245(0) to 245(n).

Returning now to step 424, if the last text field of meeting information has been reached, indicating that the last of the multiple different meeting information field parsing modules 245(0) to 245(n) has been executed, the text parsing process proceeds to step 426. At step 426, the scheduling engine 230 may determine whether any of the stored quality indicators indicates a low quality text match, where the text match does not meet certain predetermined threshold quality criteria. For instance, when the quality indicator is a probability score indicating a confidence level that the parsed text represents actual meeting information, the selected best probability score may be below a predetermined threshold, such as 0.5, indicating a low confidence level that the parsed text represents actual meeting information.

If the scheduling engine 230 determines that none of the stored quality indicators indicates a low quality text match, then there is a high confidence that the text matches have a high quality, and the text parsing process proceeds to step 428. At step 428, the interactive virtual meeting assistant 200 joins the meeting environment based on the stored meeting information. In various embodiments, the communications and connection engine 220 may cause the interactive virtual meeting assistant 200 to join the meeting using the stored meeting information, including any meeting information that was stored in conjunction with finding a preferred match or any meeting information that was stored in conjunction with selecting the best text match. For instance, the communications and connection engine 220 may use stored telephone number information to cause the interactive virtual meeting assistant 200 to join a meeting by telephone, or use stored website information to cause the interactive virtual meeting assistant 200 to join a meeting via a website.

Returning now to step 426, if the scheduling engine 230 determines that any of the stored quality indicators indicates a low quality text match, then the text parsing process proceeds to step 430. At step 430, the scheduling engine 230 determines whether to return an error message. If the scheduling engine 230 determines not to return an error message, then the process may return to step 428, where the communications and connection engine 220 may cause the interactive virtual meeting assistant 200 to join the meeting using the stored meeting information. For instance, if the only text fields that have low quality indicators are not related to information regarding how the interactive virtual meeting assistant 200 may join the meeting, such as text information related to a summary of the meeting and not related to telephone number or website information needed to dial in to the meeting, the scheduling engine 230 may determine that an error message is not necessary.

Returning now to step 430, if the scheduling engine 230 determines to return an error message when any of the quality indicators does not meet the predetermined threshold criteria, then the scheduling engine 230 proceeds to step 432. At step 432, the scheduling engine 230 may cause the communications and connection engine 220 to return an error message to the source of the meeting invitation. For instance, the error message may indicate that the meeting information could not be correctly determined from the received text information. In other embodiments, the error message may request that the user enter the meeting information manually using, for instance, a standardized form.

In sum, an improved technique for integrating an interactive virtual assistant into a meeting environment includes receiving an invitation for the interactive virtual assistant to participate in a meeting, and parsing text information included in the invitation to determine meeting information that enables the interactive virtual assistant to join the meeting. Specifically, the improved technique for integrating an interactive virtual assistant into a meeting environment includes parsing a hierarchy of different text fields of meeting information in a hierarchical manner. For each different hierarchical text field of meeting information, a hierarchy of different text parsers is applied in a hierarchical manner to produce text matches for the text field of meeting information. If applying one of the parsers to the received text information for the text field of meeting information produces a preferred match, then that preferred match is accepted and stored as the correct value for that text field of meeting information, without applying any further text parsers for that field of meeting information. If, after applying all text parsers to the received text information for that particular text field of meeting information, no preferred match is found, the text matches produced by the different text parsers are compared, and the best text match is stored as the correct value for that text field of meeting information. This procedure of applying the hierarchy of different text parsers is repeated for each text field in the hierarchy of different text fields of meeting information. The interactive virtual assistant may then join the meeting environment using the preferred matches and/or best text matches for the different text fields of meeting information. However, if any of the best text matches does not meet certain threshold quality criteria, then an error message is returned to request that the user manually enter one or more fields of meeting information.

At least one advantage of the disclosed techniques is that, by parsing different fields of meeting information in a hierarchical manner, the likelihood of finding a text match is increased. Specifically, the different hierarchical fields will have different priorities according to a predetermined hierarchy, such that higher-priority fields will take precedence over lower-priority fields. For instance, the parsing mechanism may disambiguate between different conflicting fields of meeting information, since the higher-priority fields will be used in place of any conflicting lower-priority fields.

A further advantage of the disclosed techniques is that, if a preferred match for a particular field of meeting information is found immediately, that preferred match is accepted and stored as the corresponding field of meeting information without requiring the parsing mechanism to continue to run all of the multiple different text parsers, thereby increasing efficiency in the parsing mechanism by preventing multiple unnecessary text parsers from being executed. Accordingly, when the multiple different text parsers are arranged in a hierarchy, such as when a higher-priority text parser has a higher probability of finding a preferred match, then applying these multiple different text parsers in the particular order specified by the hierarchy increases efficiency by increasing the probability that a preferred match will be found earlier in the parsing process.

1. In some embodiments, a computer-implemented method for integrating an interactive virtual assistant to in a meeting environment comprises receiving an invitation to participate in the meeting environment, wherein the invitation includes text information, applying at least a subset of a plurality of parsers to the text information in a given order to generate a text match for each of a plurality of fields of meeting information, wherein, if applying a first parser included in the plurality of parsers to the text information for a first text field produces a preferred match, then returning the preferred match for the first text field without applying any additional parsers included in the plurality of parsers to the text information for the first text field, and, in response, when the text matches for at least a subset of the plurality of fields of meeting information meet one or more predetermined threshold criteria, causing the interactive virtual assistant to join the meeting environment based on the text matches for the at least the subset of the plurality of fields of meeting information.

2. The computer-implemented method of clause 1, where, when the text matches for at least a subset of the plurality of fields of meeting information do not meet the one or more predetermined threshold criteria returning an error message.

3. The computer-implemented method of clause 1 or 2, where the given order is associated with the plurality of parsers.

4. The computer-implemented method of any of clauses 1-3, wherein the given order is associated with the plurality of fields of meeting information.

5. The computer-implemented method of any of clauses 1-4, wherein the given order is associated with a plurality of text fields included in the text information.

6. The computer-implemented method of any of clauses 1-5, wherein a parser in the plurality of parsers comprises at least one of a service-specific parser, a one-tap number parser, and a natural language parser.

7. The computer-implemented method of any of clauses 1-6, wherein a field in the plurality of fields of meeting information comprises at least one of a meeting location, a meeting description, and a summary field, phone number, a service provider associated with the meeting environment, and an organizer of the meeting environment.

8. The computer-implemented method of any of clauses 1-7, further comprising identifying the preferred match based on a quality indicator indicating a confidence level that the parsed text information represents a first field of meeting information.

9. In some embodiments, a non-transitory computer-readable storage medium including instructions that, when executed by a processor, cause the processor to integrate an interactive virtual assistant in a meeting environment, by performing the steps of receiving an invitation to participate in the meeting environment, wherein the invitation includes text information, applying at least a subset of a plurality of parsers to the text information in a given order to generate a text match for each of a plurality of fields of meeting information, wherein, if applying a first parser included in the plurality of parsers to the text information for a first text field produces a preferred match, then returning the preferred match for the first text field without applying any additional parsers included in the plurality of parsers to the text information for the first text field, and, in response, when the text matches for at least a subset of the plurality of fields of meeting information meet one or more predetermined threshold criteria, causing the interactive virtual assistant to join the meeting environment based on the text matches for the at least the subset of the plurality of fields of meeting information.

10. The non-transitory computer-readable storage medium of clause 9, wherein, when the text matches for at least a subset of the plurality of fields of meeting information do not meet the one or more predetermined threshold criteria returning an error message.

11. The non-transitory computer-readable storage medium of clause 9 or 10, wherein the given order is associated with the plurality of parsers.

12. The non-transitory computer-readable storage medium of any of clauses 9-11, wherein the given order is associated with the plurality of fields of meeting information.

13. The non-transitory computer-readable storage medium of any of clauses 9-12, wherein the given order is associated with a plurality of text fields included in the text information.

14. The non-transitory computer-readable storage medium of any of clauses 9-13, wherein a parser in the plurality of parsers comprises at least one of a service-specific parser, a one-tap number parser, and a natural language parser.

15. The non-transitory computer-readable storage medium of any of clauses 9-14, wherein a field in the plurality of fields of meeting information comprises at least one of a meeting location, a meeting description, and a summary field, phone number, a service provider associated with the meeting environment, and an organizer of the meeting environment.

16. The non-transitory computer-readable storage medium of any of clauses 9-15, further comprising identifying the preferred match based on a quality indicator indicating a confidence level that the parsed text information represents a first field of meeting information.

17. A system, comprising a processor that, when executing instructions stored in a memory, is configured to receive an invitation to participate in the meeting environment, wherein the invitation includes text information, apply at least a subset of a plurality of parsers to the text information in a given order to generate a text match for each of a plurality of fields of meeting information, wherein, if applying a first parser included in the plurality of parsers to the text information for a first text field produces a preferred match, then returning the preferred match for the first text field without applying any additional parsers included in the plurality of parsers to the text information for the first text field, and, in response, when the text matches for at least a subset of the plurality of fields of meeting information meet one or more predetermined threshold criteria, cause the interactive virtual assistant to join the meeting environment based on the text matches for the at least the subset of the plurality of fields of meeting information.

18. The system of clause 17, wherein the given order is associated with the plurality of parsers.

19. The system of clause 17 or 18, wherein the given order is associated with the plurality of fields of meeting information.

20. The system of any of clauses 17-19, wherein the given order is associated with a plurality of text fields included in the text information.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The disclosure has been described above with reference to specific embodiments. Persons of ordinary skill in the art, however, will understand that various modifications and changes may be made thereto without departing from the broader spirit and scope of the disclosure as set forth in the appended claims. The foregoing description and drawings are, accordingly, to be regarded in an illustrative rather than a restrictive sense.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for integrating an interactive virtual assistant into a meeting environment, comprising:
   receiving an invitation to participate in the meeting environment, wherein the invitation includes text information;
   applying at least a subset of a plurality of parsers to the text information in a given order to generate a respective text match for each of a plurality of text fields associated with meeting information, wherein, if applying a first parser included in the plurality of parsers to the text information for a first text field included in the plurality of text fields produces a text match that satisfies one or more threshold criteria, then the text match satisfying the one or more threshold criteria is returned without applying any additional parsers included in the plurality of parsers to the text information for the first text field; and
   causing the interactive virtual assistant to join the meeting environment based on the text matches of the plurality of text fields.

2. The computer-implemented method of claim 1, wherein, when the text matches for at least a subset of the plurality of fields of meeting information do not meet the one or more predetermined threshold criteria returning an error message.

3. The computer-implemented method of claim 1, wherein the given order is associated with the plurality of parsers.

4. The computer-implemented method of claim 1, wherein the given order is associated with the plurality of fields of meeting information.

5. The computer-implemented method of claim 1, wherein the given order is associated with a plurality of text fields included in the text information.

6. The computer-implemented method of claim 1, wherein a parser in the plurality of parsers comprises at least one of a service-specific parser, a one-tap number parser, and a natural language parser.

7. The computer-implemented method of claim 1, wherein a field in the plurality of fields of meeting information comprises at least one of a meeting location, a meeting description, and a summary field, phone number, a service provider associated with the meeting environment, and an organizer of the meeting environment.

8. The computer-implemented method of claim 1, further comprising identifying the preferred match based on a quality indicator indicating a confidence level that the parsed text information represents a first field of meeting information.

9. A non-transitory computer-readable storage medium including instructions that, when executed by a processor, cause the processor to integrate an interactive virtual assistant into a meeting environment, by performing the steps of:

receiving an invitation to participate in the meeting environment, wherein the invitation includes text information;

applying at least a subset of a plurality of parsers to the text information in a given order to generate a respective text match for each of a plurality of text fields associated with meeting information, wherein, if applying a first parser included in the plurality of parsers to the text information for a first text field included in the plurality of text fields produces a text match that satisfies one or more threshold criteria, then text match satisfying the one or more threshold criteria is returned without applying any additional parsers included in the plurality of parsers to the text information for the first text field; and causing the interactive virtual assistant to join the meeting environment based on the text matches of the plurality of text fields.

10. The non-transitory computer-readable storage medium of claim 9, wherein, when the text matches for at least a subset of the plurality of fields of meeting information do not meet the one or more predetermined threshold criteria returning an error message.

11. The non-transitory computer-readable storage medium of claim 9, wherein the given order is associated with the plurality of parsers.

12. The non-transitory computer-readable storage medium of claim 9, wherein the given order is associated with the plurality of fields of meeting information.

13. The non-transitory computer-readable storage medium of claim 9, wherein the given order is associated with a plurality of text fields included in the text information.

14. The non-transitory computer-readable storage medium of claim 9, wherein a parser in the plurality of parsers comprises at least one of a service-specific parser, a one-tap number parser, and a natural language parser.

15. The non-transitory computer-readable storage medium of claim 9, wherein a field in the plurality of fields of meeting information comprises at least one of a meeting location, a meeting description, and a summary field, phone number, a service provider associated with the meeting environment, and an organizer of the meeting environment.

16. The non-transitory computer-readable storage medium of claim 9, further comprising identifying the preferred match based on a quality indicator indicating a confidence level that the parsed text information represents a first field of meeting information.

17. A system, comprising:

a processor that, when executing instructions stored in a memory, is configured to:

receive an invitation to participate in a meeting environment, wherein the invitation includes text information;

apply at least a subset of a plurality of parsers to the text information in a given order to generate a respective text match for each of a plurality of text fields associated with meeting information, wherein, if applying a first parser included in the plurality of parsers to the text information for a first text field included in the plurality of text fields produces a text match that satisfies one or more threshold criteria, then the text match satisfying the one or more threshold criteria is returned without applying any additional parsers included in the plurality of parsers to the text information for the first text field; and cause the interactive virtual assistant to join the meeting environment based on the text matches of the plurality of text fields.

18. The system of claim 17, wherein the given order is associated with the plurality of parsers.

19. The system of claim 17, wherein the given order is associated with the plurality of fields of meeting information.

20. The system of claim 17, wherein the given order is associated with a plurality of text fields included in the text information.

* * * * *